Feb. 2, 1971   J. G. LEWIS   3,560,109

ANTIWINDMILLING

Filed June 2, 1969   2 Sheets-Sheet 1

INVENTOR
JOHN G. LEWIS

By (signature)

ATTORNEY

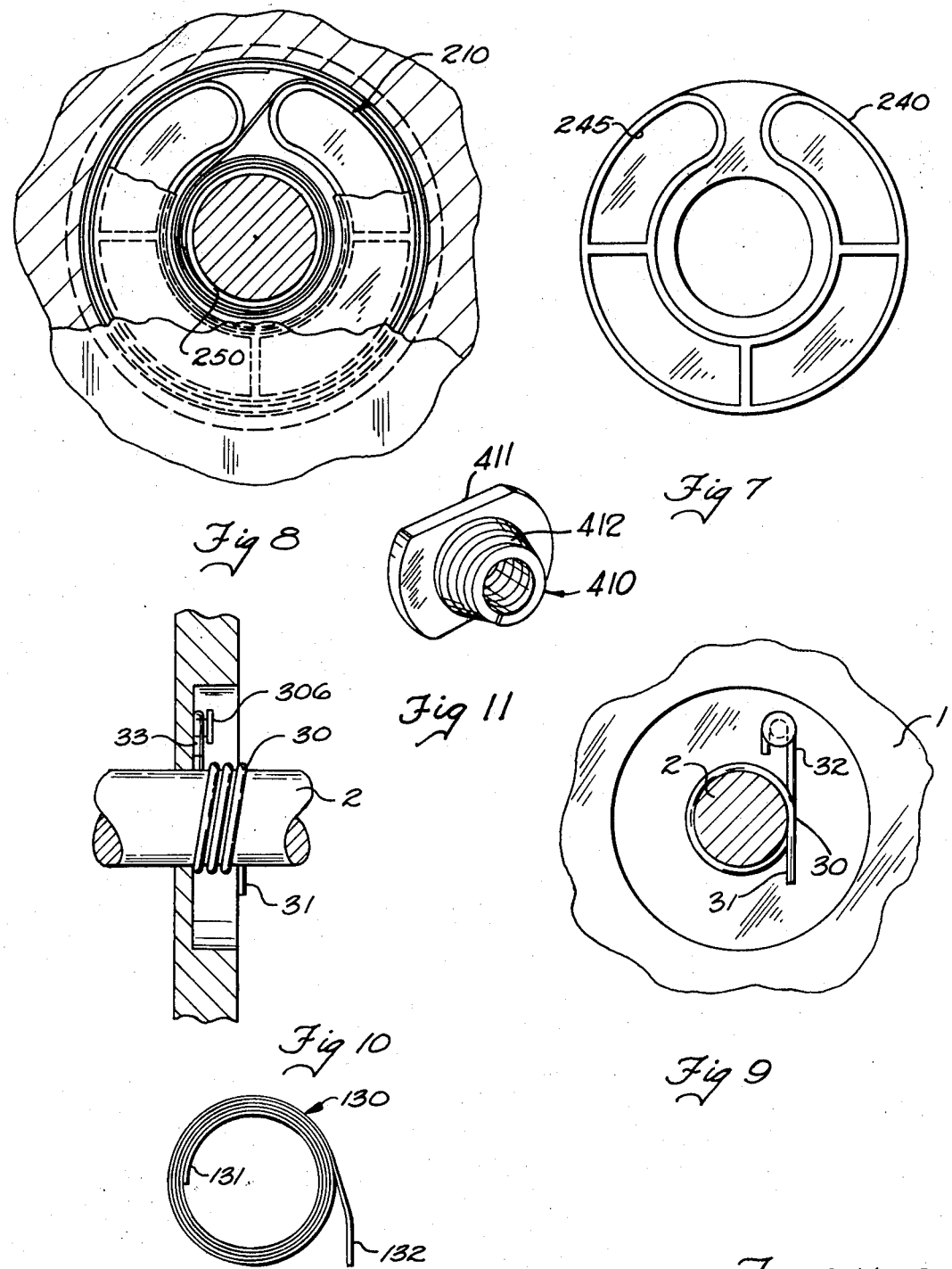

United States Patent Office

3,560,109
Patented Feb. 2, 1971

3,560,109
ANTIWINDMILLING
John G. Lewis, St. Louis, Mo., assignor to Emerson Electric Co., St. Louis, Mo., a corporation of Missouri
Filed June 2, 1969, Ser. No. 829,468
Int. Cl. B64c *11/00*
U.S. Cl. 416—169    11 Claims

ABSTRACT OF THE DISCLOSURE

In a unidirectional electric fan a movable brake surface is resiliently biased toward a motor shaft by means anchored to a fixed frame and external to the motor shaft and moved in a direction away from the shaft by the shaft itself when the shaft is driven by the motor. Preferably, a multiturn spring embraces the shaft and has a part anchored to a fixed frame and another part in frictional engagement with a bearing surface on the shaft. The spring is so formed and arranged as to move away from the bearing surface when the motor shaft is rotated in the direction in which it is driven by the motor and to move toward the bearing surface when the shaft is not rotated in that direction.

BACKGROUND OF THE INVENTION

In fans such as window and exhaust fans which are operated intermittently and which may be subjected to drafts which tend to rotate the blades of the fan slowly, there are two disadvantages to permitting the blades to windmill. If the blades are rotating backward at a considerable speed, and the motor is turned on, a heavy starting current is drawn which may damage the motor or blow a fuse. More importantly, a slow windmilling, particularly with aluminum bearings, will produce excessive bearing wear, because at the very low speeds involved, the bearing is not properly lubricated.

Various rather complicated schemes have been suggested for coping with this problem, but they have been too expensive to meet with commercial success.

One of the objects of this invention is to provide an antiwindmilling device which is simple in construction, inexpensive to produce, and effective in use.

Other objects will become apparent to those skilled in the art in the light of the following description and accompanying drawing.

SUMMARY OF THE INVENTION

In accordance with this invention, generally stated, in a unidirectional electric fan having a blade, an electric motor, including a motor shaft connected to drive the blade, and a fixed frame in the form of an end shield, motor housing or base, an anti-windmilling device is provided which includes a brake surface resiliently biased toward the motor shaft by means anchored to a fixed frame and external to the shaft and moved in a direction away from the shaft by the rotation of the shaft itself in the direction in which it is driven by the motor. Preferably, the brake surface is a part of a multiturn spring embracing the motor shaft and having one part anchored to the fixed frame and another part in frictional engagement with a bearing surface on the shaft. The spring is preferably helical or spiral and so arranged as to pump oil toward an adjacent motor bearing.

In one embodiment, the spring is convolutely wound around a bearing sleeve or spool mounted on the shaft and has an outer end anchored in a case which is mounted on the fixed frame.

In the preferred embodiment, the spring is molded of molybdenum disulfide-filled plastic, helical in form but with progressively larger cross-sectional areas from its outer end to an integral base. The braking characteristics are such that the spring will hold the shaft against rotation in response to a turning force in a windmilling direction of, for example 22 ounce-feet but will permit the shaft to break away under a greater torque without damage to the spring.

The helical or spiral forms may be double ended.

So-called coil clutches were used in early automobiles, to transmit power (cf. Automobile Motors and Mechanism, 1909. The Charles C. Thompson Co., page 140), but the use of such a device for the opposite purpose, and in such a slow speed, low-power application has never been contemplated heretofore.

BRIEF DESCRIPTION OF THE DRAWINGS

In the drawings.

FIG. 6 is a view in front elevation of a convolutely wound spring useful in the embodiments of device shown in FIGS. 4 and 5 and 7 and 8;

FIG. 7 is a view in elevation of a retainer forming a part of an antiwindmilling device unit;

FIG. 8 is a fragmentary sectional view taken transversely of the shaft and looking outwardly, of still another embodiment of antiwindmilling device, utilizing the retainer of FIG. 7;

FIG. 9 is a fragmentary sectional view, transversely of the motor shaft, showing an electric motor equipped with still another embodiment of antiwindmilling device of this invention;

FIG. 10 is a fragmentary sectional view axially of the motor shaft of the motor and antiwindmilling device shown in FIG. 9; and FIG. 11 is a view in perspective of still another embodiment of antiwindmilling device of this invention.

DESCRIPTION OF THE PREFERRED EMBODIMENT

Figure 1:
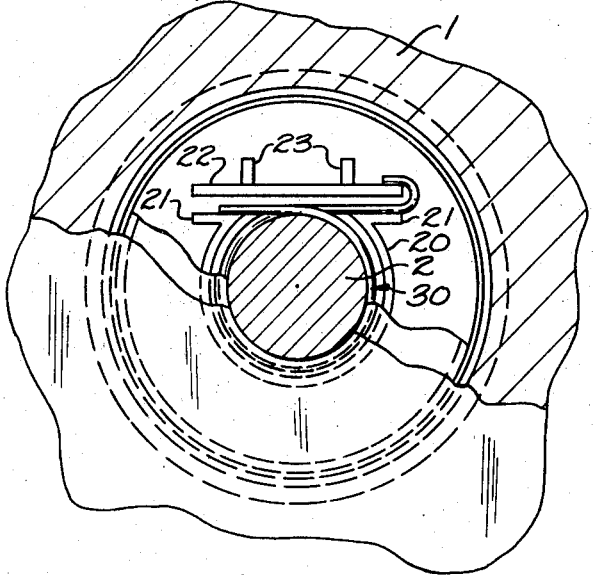
FIG. 1 is a fragmentary sectional view, transversely of the motor shaft and looking outwardly, partly broken away, showing an electric motor equipped with one embodiment of antiwindmilling device of this invention.
Figure 2:
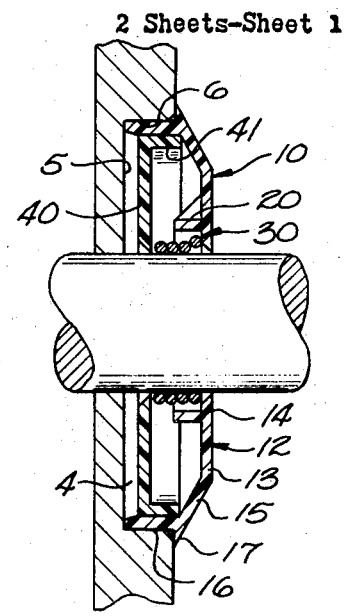
FIG. 2 is a fragmentary sectional view axially of the motor shaft, of the embodiment of device shown in FIG. 1, seated in a well in an end shield.
Figure 3:
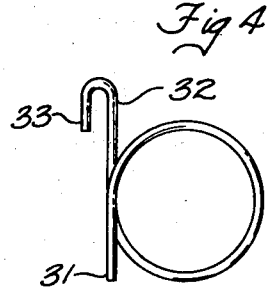
FIG. 3 is a view in front elevation of the helically wound spring of the device shown in FIGS. 1 and 2.

Referring now to the drawings, and particularly to FIGS. 1, 2 and 3 for one illustrative embodiment of antiwindmilling device of this invention, reference numeral 1 indicates an end shield of an electric motor. The electric motor has a drive shaft 2 on which is mounted a set of fan blades, not here shown. The shaft 2, journaled in bearings, not here shown, passes through the end shield at the radial center of a well 4, defined by a bottom wall 5, and cylindrical side wall 6. These elements of end shield are the same in all of the embodiments shown and described. However, their particular arrangement is not an essential part of the invention.

An antiwindmilling device 10 includes a case 12, mounted snugly within the well 4, and in engagement with the side wall 6; a helically wound coil spring 10, and a cover 50.

The case 12 has a dished outer wall 13 with a flat backed center section 14 in which a central aperture surrounds and is spaced slightly from the shaft 2, and an inwardly tending section 15. A rim 16, integral with the inwardly tending section 15 is perpendicular to the center section 14. An end shield engaging annular lip 17 projects radially outwardly from the rim 16 at its juncture with the inwardly tending section 15. A collar 20, molded integrally with the inner surface of the outer wall 13, is concentric with the opening in the outer wall and is spaced substantially from the shaft 2. The collar 20 is interrupted chordally, and is provided with wings 21 projecting outwardly to form supporting ledges for two ends of the spring 30. A shelf 22, reinforced by gussets 23, is spaced from but parallel to facing ledge surfaces of the wings 21, as shown particularly in FIG. 1.

The spring 30 has tangentially directed opposite ends 31 and 32. The end 32 terminates in a crook 33. The ends 31 and 32 of the spring rest upon ledge surfaces of opposite wings 21, and the crook 33 of the end 32 is hooked around one end of the shelf 22. Intermediate the ends 31 and 32, the spring 30 engages the shaft 2.

The cover 40 in this embodiment serves only as a closure. It has a flange 41, which fits tightly within the wall 16 of the case, and an aperture through which the shaft 2 extends.

The spring 30 is light and only sufficiently strong to provide enough frictional engagement with the shaft to insure a tightening action if the shaft attempts to turn backward which, in the embodiment shown, is counterclockwise as viewed in FIG. 1. When the shaft turns in response to the energizing of the motor, it moves clockwise, as viewed in FIG. 1, which, tending to unwind the spring, causes it to move radially away from the shaft.

Figure 4:
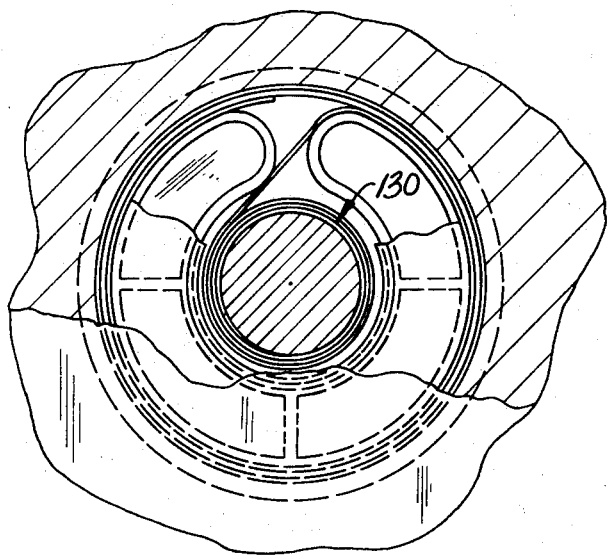
FIG. 4 is a fragmentary sectional view transversely of the shaft and looking outwardly, partly broken away, of another embodiment of antiwindmilling device of this invention.
Figure 5:
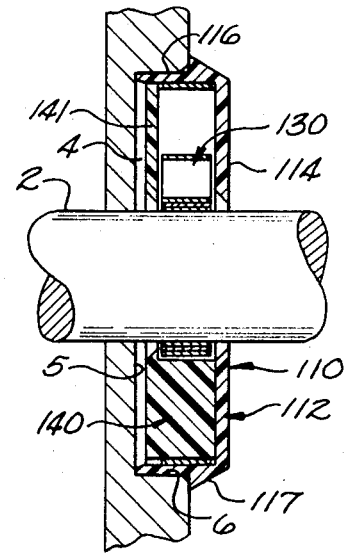
FIG. 5 is a fragmentary sectional view taken axially of the shaft, of the embodiment of the device shown in FIG. 4 seated in an end shield well.

Referring now to FIGS. 4, 5 and 6 for another embodiment of antiwindmilling device of this invention, reference numeral 110 indicates such device made up of a case 112, a convolutely wound spring 130 and a retainer-closure 140. The case 112 of this embodiment has a flat outer wall 114, an integral rim 116 and an annular lip 117. The lip 117 has a radially directed inner face and a chamfered outer face. The outer wall 114 has a center opening to admit the shaft 2, and its radial faces are otherwise uninterrupted.

The convolutely wound spring 130 has an inner end 131 and an outer end 132. The inner end 131 extends around and closely adjacent the shaft 2, at least a portion of the first turn of the spring from the end 131 engaging the shaft. The other end 132 of the spring 130 leaves the coiled portion of the spring tangentially, and is mounted in snug engagement with the inside surface of the rim 116 by means of the retainer-closure 140. The retainer closure 140 has a horseshoe-shaped retaining wall 145, molded integrally with a cover 141. The wall 145 has two rounded ends, as shown clearly in FIG. 2, around one of which the outer end 132 of the spring 130 tends. The end 132 of the spring 130 is held firmly between the outer surface of the wall 145 and the inner surface of the rim 116.

As in the embodiment shown in FIGS. 1, 2 and 3, the shaft is intended to rotate clockwise as viewed in FIG. 4. This tends to unwind the spring 130, causing it to move radially away from the shaft 2. When the shaft 2 stops rotating, the spring 130 tightens around it, and the tightening of the spring 130 is increased by any tendency of the shaft 2 to turn counterclockwise.

Referring now to FIGS. 6, 7 and 8 for still another embodiment of antiwindmilling device of this invention, reference numeral 210 indicates a device made up of a case 212 identical in all respects to the housing 112 of the embodiment shown in FIGS. 4 and 5, a helical spring 130, a retainer-closure 240, and a spool 250.

The retainer-closure 240 is the same as the retainer-closure 140 of the embodiment shown in FIGS. 4 and 5, except that the radially inner face of wall 245 is spaced radially slightly farther from the shaft than the radially inner face of the wall 145. In this embodiment, the spring 130 is mounted on the spool 250, and the end 132 of the spring is mounted within the housing 210. The entire unitary assembly is then mounted on the motor by forcing the spool 250 onto and along the shaft 2, and the case 210 with it, until, as in the other embodiments, the case is forced into the well 4 with the lip of the case in snug engagement with the end shield around the well 4.

The advantage of the embodiment of device shown in FIGS. 7 and 8 is that it can be preassembled to form the antiwindmilling unit, and mounted on the motor quickly and easily. Additionally, the bearing of the spring 130 on the outer surface of the spool 250 eliminates any wear on the surface of the shaft. The surface of the spool 250 can be given any desired degree of slickness or roughness, and can even be serrated in ratchet fashion or corrugated axially, to vary the grasping and slipping characteristics of the spring. In the embodiments shown, the cases, covers, retainer-closures and spool have been molded of suitable plastic, and the springs have been made of steel.

In the embodiment shown in FIGS. 9 and 10, the spring 30 is merely slipped onto the shaft 2 and its hooked end, mounted on a headed post 306, which can be integral with the casting or take the form of a headed rivet driven into a socket in the end shield. This illustrates an extremely simple version of the device. A protective cover can, of course, be provided for the sake of safety and appearance.

In the embodiment shown in FIG. 11, a spring 410 is formed of nylon containing approximately 5% (by weight) molybdenum disulfide. The spring is molded and includes a base 411 and a helical section 412. The base 411 has two flat edges and two arcuate edges, the base being dimensioned for tight frictional engagement of the arcuate edges with the cylindrical wall of the well of an end shield of the same description as those shown in connection with the other embodiments. In the embodiment shown, the helical section 412 which extends axially outwardly of the base and end shield and embraces the shaft, has four full turns. The diameter of the bore of the helical section 412 through the turns outboard of the base is uniform, and slightly less than that of the shaft. The diameter of the bore at the base is slightly greater, to accommodate small eccentricities of the shaft and well.

The outside surface of the helical portion of the spring 410 is frusto-conical, so that the cross-sectional area of the helical portion becomes progressively greater than the outermost turn to the base. The axial thickness can also be varied. Such an arrangement is desirable because the forces exerted on successive turns are cumulative.

It can be seen that any oil on the shaft will be pumped, when the shaft is driven by the motor, back toward the end shield, hence the motor bearing.

If the end shield well is sufficiently deep, a second helical part with an opposite turn can be molded integrally with the opposite side of the base. In such an embodiment, the number of turns on each side can be made fewer than when only a single helical part is employed, and the same spring can be used for either direction of rotation of the motor shaft. For that matter, the spring of the embodiment shown in FIG. 11 can be reversed to accommodate opposite rotation of the motor shaft. However, in that case, the tendency of the spring in the opposite direction of rotation is to pump oil from the bearing. In the case of the double-ended spring both helical parts tend to pump toward the base. Accordingly, from the oil pumping point of view, two different springs oppositely "wound" are preferably to accommodate the two different directions of rotation. As a practical matter, most fan motors run counterclockwise.

It is also possible to make a spring which is hairpin-shaped, in which the legs are wound to form a helix, to produce a reversible spring.

Numerous other variations in the construction of the antiwindmilling device of this invention, within the scope of the appended claims, will occur to those skilled in the art in the light of the foregoing disclosure. Merely by way of example, the spring may be made of other plastic such as nylon with Teflon, nylon with glass reinforcing, or polyesters, or of beryllium copper. Other means of anchoring one end of the spring in some other fixed member such as the motor housing or even a base can be used. Even in the simplest of versions, a notch or other anchoring means can be used in lieu of the post. The number of turns and the configuration of the springs can be varied. The cases or covers or retainer-closures or spool can be made of metal. These are merely illustrative.

Having thus described the invention, what is claimed and desired to be secured by Letters Patent is:

1. In a unidirectional electric fan having a blade, an electric motor including a motor shaft connected to drive said blade and a fixed frame, an antiwindmilling device comprising a multiturn spring embracing said shaft and having a part anchored to said fixed frame and another part in frictional engagement with a bearing surface on said shaft, the turns of said spring being so directed as to move said spring away from said bearing surface when the motor shaft is rotating in the direction in which it is driven by said motor and to move toward the said bearing surface when the shaft is not rotating in said direction.

2. The device of claim 1 wherein the spring is helical.

3. The device of claim 1 wherein the spring is convolute.

4. The device of claim 2 wherein the spring is made of plastic.

5. The device of claim 4 wherein the spring has an integral base.

6. The device of claim 4 wherein the spring is molded of molybdenum disulfide-filled nylon.

7. The device of claim 5 wherein the cross-sectional area of said helical spring increases from its free end to said base.

8. The device of claim 1 wherein the motor has an end shield with a well in it and the spring has an outer end anchored in a case mounted in said well.

9. The device of claim 8 wherein the spring is convolute.

10. The device of claim 9 wherein the spring embraces a bearing sleeve mounted on said shaft.

11. In a unidirectional fan having a blade, an electric motor including a motor shaft connected to drive said blade, and a fixed frame, an antiwindmilling device comprising a brake surface, means resiliently biasing said brake surface toward said motor shaft, said means being anchored to said fixed frame and positioned and arranged to be moved in a direction away from the shaft by the rotation of the shaft in the direction in which it is driven by said motor.

References Cited

UNITED STATES PATENTS

| | | | |
|---|---|---|---|
| 843,380 | 2/1907 | Winton et al. | 416—169 |
| 1,771,654 | 7/1930 | Powell | 416—169X |
| 2,569,144 | 9/1951 | Benson | 416—169X |

EVERETTE A. POWELL, JR., Primary Examiner

UNITED STATES PATENT OFFICE
CERTIFICATE OF CORRECTION

Patent No. 3,560,109            Dated February 2, 1971

Inventor(s) John G. Lewis

It is certified that error appears in the above-identified patent and that said Letters Patent are hereby corrected as shown below:

Column 4, line 46, after "greater" cancel "than" and insert -- from --.

Signed and sealed this 17th day of August 1971.

(SEAL)
Attest:

EDWARD M. FLETCHER, JR.          WILLIAM E. SCHUYLER,
Attesting Officer                 Commissioner of Paten

FORM PO-1050 (10-69)